United States Patent
Sprouts

(10) Patent No.: US 6,514,595 B1
(45) Date of Patent: Feb. 4, 2003

(54) INTEGRATED MARKING MATERIALS

(75) Inventor: Sandra R. Sprouts, Oakwood Village, OH (US)

(73) Assignee: MBT Holding AG, Zurich (CH)

( * ) Notice: Subject to any disclaimer, the term of this patent is extended or adjusted under 35 U.S.C. 154(b) by 0 days.

(21) Appl. No.: 09/299,536

(22) Filed: Apr. 26, 1999

Related U.S. Application Data

(60) Provisional application No. 60/083,960, filed on May 1, 1998.

(51) Int. Cl.$^7$ .................................................. E01F 9/04
(52) U.S. Cl. ........................ 428/143; 428/149; 428/325; 404/14; 359/539; 359/540; 106/676; 106/691; 106/712; 106/716
(58) Field of Search ............................... 428/143, 149, 428/325; 404/14; 359/539, 540; 106/676, 691, 712, 716

(56) References Cited

U.S. PATENT DOCUMENTS

| | | | |
|---|---|---|---|
| 1,830,872 A | * | 11/1931 | Ellis ........................... 359/539 |
| 2,345,644 A | | 4/1944 | Weber |
| 3,171,335 A | | 3/1965 | Pincon et al. |
| 3,693,511 A | | 9/1972 | Medynski |
| 3,836,226 A | | 9/1974 | Cechetini |
| 4,123,140 A | | 10/1978 | Ryan et al. |
| 4,175,978 A | | 11/1979 | Marzocchi et al. |
| 4,185,132 A | | 1/1980 | Gurney |
| 4,218,260 A | | 8/1980 | Metzler |
| 4,255,468 A | | 3/1981 | Olson |
| 4,296,006 A | | 10/1981 | Bugdahl et al. |
| 4,579,891 A | | 4/1986 | Dugan et al. |
| 4,772,155 A | | 9/1988 | Dinitz |
| 4,896,453 A | | 1/1990 | Jacob |
| 4,937,127 A | | 6/1990 | Haenggi et al. |
| 5,082,715 A | | 1/1992 | Lasch et al. |
| 5,094,902 A | | 3/1992 | Haenggi et al. |
| 5,128,203 A | | 7/1992 | LaRoche |
| 5,194,113 A | | 3/1993 | Lasch et al. |
| 5,269,840 A | | 12/1993 | Morris et al. |
| 5,340,652 A | | 8/1994 | Sondhe et al. |
| 5,380,549 A | | 1/1995 | Harvison |
| 5,422,162 A | | 6/1995 | Passarino et al. |
| 5,439,312 A | | 8/1995 | Marcato |
| 5,453,320 A | | 9/1995 | Harper et al. |
| 5,456,546 A | | 10/1995 | Bollag |
| 5,472,737 A | | 12/1995 | Anders |
| 5,478,596 A | | 12/1995 | Gurney |
| 5,502,593 A | | 3/1996 | Hedgewick |
| 5,511,896 A | | 4/1996 | Marcato |
| 5,516,227 A | | 5/1996 | Kozak et al. |
| 5,536,569 A | | 7/1996 | Lasch et al. |
| 5,599,133 A | | 2/1997 | Costello et al. |
| 5,601,911 A | | 2/1997 | Ochi et al. |
| 5,660,497 A | | 8/1997 | Kozak et al. |
| 5,665,793 A | | 9/1997 | Anders |
| 5,672,379 A | | 9/1997 | Schall et al. |
| 5,753,036 A | * | 5/1998 | Hornaman et al. ......... 106/724 |
| 5,922,796 A | | 7/1999 | Colombet et al. |
| 5,947,635 A | | 9/1999 | Wilson, Jr. |
| 5,951,201 A | | 9/1999 | Jones |
| 5,980,664 A | | 11/1999 | Wilson, Jr. |
| 6,020,073 A | | 2/2000 | Wilson, Jr. |
| 6,090,892 A | * | 7/2000 | Ishida et al. ................ 525/212 |

FOREIGN PATENT DOCUMENTS

| | | |
|---|---|---|
| AU | 404612 | 5/1967 |
| AU | 33909/93 B | 9/1993 |
| AU | 199941086 A1 | 10/1999 |
| CH | 562372 | 5/1975 |
| DE | 2347055 A1 | 3/1975 |
| DE | 2443835 A1 | 4/1976 |
| DE | 24 57 766 | 6/1976 |
| DE | 3419196 A1 | 11/1985 |
| DE | 4244665 A1 | 11/1993 |
| DE | 19744834 A1 | 4/1999 |
| EP | 518854 A1 | 12/1992 |
| EP | 812887 A2 | 12/1997 |
| EP | 911304 A1 | 4/1999 |
| FR | 726252 | 5/1932 |
| FR | 859180 | 12/1940 |
| FR | 2170043 | 1/1973 |
| FR | 2740462 A1 | 10/1995 |
| FR | 2749007 A1 | 5/1996 |
| GB | 905988 | 9/1962 |
| GB | 1397737 | 6/1975 |
| GB | 2255099 A | 10/1992 |
| JP | 1271702 A | 10/1989 |
| JP | 3187403 A | 8/1991 |
| JP | 4149305 A | 5/1992 |
| JP | 7010627 A | 1/1995 |
| WO | WO95/22662 A1 | 8/1995 |
| WO | WO97/00357 A1 | 1/1997 |
| WO | WO99/20701 A1 | 4/1999 |
| WO | WO00/09811 A1 | 2/2000 |

OTHER PUBLICATIONS

Derwent WPI Publication, Accession No. XP–002114130. English language abstract for SE9202882. (Oct. 2, 1992).

(List continued on next page.)

*Primary Examiner*—William P. Watkins, III
(74) *Attorney, Agent, or Firm*—Renner, Kenner, Greive, Bobak, Taylor & Weber

(57) ABSTRACT

A dry formulation for an integrated marking material for concrete and asphalt application comprises a cementitious mixture including a hydraulic or cementitious binder, a redispersible polymeric cement modifier, a retroreflective agent filler, and optionally, a reflective agent filler. The formulation preferably includes a pigment, aggregate, a dispersant, a plasticizer, and/or a water reducer. The formulation optionally includes at least one admixture selected from an accelerator, an air entrainer, a defoamer, fibers, an inert filler, a natural clay, a pozzolanic filler, a retarder, a rheology modifier, a shrinkage compensating agent, a synthetic clay, a suspending agent, and a thickening agent. The marking material, when applied, has broadcast onto and embedded into its surface, additional retroreflective agents.

58 Claims, No Drawings

OTHER PUBLICATIONS

Derwent WPI Publication, Accession No. XP–002114131. English language abstract for JP04119951. (Apr. 21, 1992).

"Standard Specification for Pigments for Integrally Colored Concrete", ASTM–C 979, 1982 (Reapproved 1993).

Derwent WPI Publication, Accession No. 1999–530666/19995, "English language abstract for JP 2953576," (Sep. 27, 1999).

Derwent WPI Publication Accession No. 1995–290609/199538, "English language abstract for JP 7188583," (Jul. 25, 1995).

Derwent WPI Publication, Accession No. 1999–308783/199926, "English language translation of JP 11107227," (Apr. 20, 1999).

* cited by examiner

INTEGRATED MARKING MATERIALS

CROSS REFERENCE TO RELATED APPLICATIONS

The present application claims the benefit of U.S. Provisional Patent Application No. 60/083,960, filed May 1, 1998.

TECHNICAL FIELD

The present invention relates to integrated retroreflective marking materials for fresh or hardened concrete and asphalt surfaces, such as roads, highways and the like. The present invention relates particularly to cementitious material formulations which contain a redispersible polymer and retroreflective/reflective materials.

BACKGROUND OF THE INVENTION

Currently, the marking of concrete and asphalt for lane striping or cautionary markings is generally accomplished by painting stripes or applying preformed tapes of polymeric material. Disadvantages of these methods include the fact that both are temporary, requiring frequent, periodic reapplication.

To provide a longer lasting product, several marking methods include using a system which consists of a two part epoxy, thermoplastic, polyester, methyl methacrylates, or polyurethane resin system. Most of these products are solvent based or reactive resins which require special handling, storage, mixing, application and disposal procedures. With solvent-borne paint products, including the typical one-part traffic paint, the release of solvent into the environment with each application presents certain hazards to the environment as well as for nearby workers and applicators.

In some situations, retroreflectivity of the markings is desired, for enhanced night-time visibility. This has been proposed to be accomplished by several techniques. In one technique, preformed reflector devices are partially embedded in the roadway at regular intervals. The exposed portion of the reflector soon gathers a deposit of dirt or silt, which reduces visibility. The exposed portion of such a reflector may be damaged and worn away with repeated contact with vehicle tires, and cleaning or snow removal equipment.

Another technique is to precast a panel of concrete having reflective or retroreflective materials embedded into its surface, and then to position or affix the panel to the roadway surface or highway barrier. This requires custom prefabrication of the structures, and storage, transportation and placement of the heavy articles.

One onsite highway marking technique involves broadcasting a quantity of reflective or retroreflective materials onto the surface of a coating of paint applied to the surface of the roadway, optionally including a second coating of paint to lock in the particles. Similarly, it has been proposed to broadcast reflective glass beads onto a bonding polymer coating (such as epoxy) on the roadway, followed by application of a weathering top coat (such as a urethane). Again, these road markings are temporary, and require frequent reapplication.

A variant of the marking tape technique has been proposed, in which several layers of polymeric materials are adhesively bonded in the tape, at least one of which carries transparent microspheres or other reflective elements. In a related proposal, a single layer of polymeric tape carries embedded ceramic spheroids, to be used for marking lines on roadways.

These tapes are also temporary in nature, rapidly wearing due to the friction of vehicle tires, or pealing away from the roadway because of such friction or poor adhesion to the road surface. Due to the fact that these tapes are polymeric, they have different thermal properties than the substrate to which they are applied. In hot weather for example, preformed tapes tend to soften, collect debris, crack and delaminate. They can also require an epoxy-bonding agent to improve adhesion to the substrate. This complicates the application to the pavement, and introduces yet another thermally dissimilar material to the system.

Australian Patent 667210 proposes a surface coating composition for road marking, delivered to the site in two parts, one being a dry blend and the other being a liquid mixture. The dry blend includes white portland cement, titanium dioxide, refractory cement, and aggregate in the form of 150 to 600 micron sized garnet, or 250 to 600 micron sized garnet and 150 to 600 micron sized glass spheres. The liquid mixture includes acrylic cement polymer modifier, acrylate/styrene copolymer cement modifier, foam control agent, non retarding mortar, plasticiser and water. The two components are mixed onsite, and applied to the road as a paste. A stream of glass beads, 0.85 mm to 1.18 mm (850 to 1180 microns) in size are sprayed onto the paste to partially embed them for reflectivity.

There are several shortcomings with the marking material described in the Australian Patent. First, the fact that the marking material is a two phase system introduces variability and the possibility of improper dosage during the on site preparation of the paste to be applied to the roadway. The liquid portion, being susceptible to uncertain loading level, and being susceptible to spillage, is of concern to the environmental and structural integrity of the worksite. One must rely on the road crew to correctly measure and thoroughly mix the liquid and dry portions of the system, even if one could be sure that the correct loading levels of ingredients were present in the liquid portion.

Even if the liquid portion is pre-proportioned, it has to be mixed with additional water to achieve the desired workability. If the correct amount of water is not added, both the plastic and hardened properties of the finished product will be compromised. If the consistency of the marking material is too wet or too dry, the use of a liquid polymer as a primary component does not allow for any adjustments in dosage without affecting the performance of the finished product. The proportion of polymer in the marking material disclosed in the Australian Patent is quite high, raising concerns about the strength and abrasion resistance of the resulting product. The high polymer level also causes set retardation as evidenced by the use of a stream of hot air to accelerate the setting time and embed the glass beads. The hot air can cause rapid drying of the surface and differential hydration of the cement.

The glass spheres incorporated in the mixture of the marking material is more suitable for utility as an aggregate for the cementitious component, rather than promoting dry and wet night-time visibility and retroreflection, once the surface-borne glass beads are worn. Also, due to the ratio of garnet to glass beads used in the material, the small proportion of integral beads would be overshadowed by the larger and darker mineral aggregate after the surface is worn.

It would be preferred that a cementitious marking material be formulated as a one phase system, preferably a dry system, to ensure that the component levels were precise and uniform throughout, and to avoid storage restrictions (such as to prevent freezing) and transport of large quantities of liquid product with its attendant disadvantages of added cost and the need for disposal of plastic packaging containers.

However, the use of a significant portion of dry polymeric materials in cementitious mixtures presents other disadvantages. The polymer needs to be wetted out before use. The polymer often acts as a retarder for the system, and additionally, entrains more air in the cementitious mixture. Also, the polymer often presents a foaming problem.

It is therefore an object of the present invention to provide a marking material for fresh or hardened concrete or asphalt applications that is integrated, versatile in its mode of application, and long lasting with respect to the marked concrete or asphalt surface.

It is a further object of the present invention to provide an integrated marking material for fresh or hardened concrete or asphalt applications that can be stored and transported as a dry formulation.

It is a further object of the present invention to provide a dry formulation for an integrated marking material for concrete or asphalt applications that can be mixed with water on site for simple application to a road or highway.

It is a further object of the present invention to provide a dry formulation for an integrated marking material for concrete or asphalt applications that avoids the problems attendant with the incorporation of a large proportion of polymer in cementitious materials.

It is a further object of the present invention to provide a dry formulation for an integrated marking material for fresh or hardened concrete and asphalt, which can be formulated to meet various product application and performance demands.

It is a further object of the present invention to provide a dry formulation for an integrated marking material for concrete or asphalt applications that has high initial retroreflectivity when tested in accordance with ASTM standards (such as ASTM D-4061).

It is a further object of the present invention to provide a dry formulation for an integrated marking material for concrete or asphalt applications that retains high retroreflectivity even after wear of the exposed surface occurs.

It is a further object of the present invention to provide a dry formulation for an integrated marking material for concrete or asphalt applications that has high ultimate compressive strength, and is abrasion resistant.

SUMMARY OF THE INVENTION

The present invention therefore provides a dry formulation for an integrated retroreflective marking material for concrete or asphalt applications comprising a cementitious mixture including a hydraulic or cementitious binder, a redispersible polymer cement modifier, a retroreflective agent filler, and preferably, a reflective agent filler.

The present invention further provides a dry formulation for an integrated retroreflective marking material for concrete or asphalt applications wherein the polymeric cement modifier is a dry redispersible polymer selected from the group consisting of acrylates, methacrylates, ethylene vinyl acetate, styrene-acrylate, styrene-butadiene, polyvinyl acetate, acrylonitrile-butadiene, polychloroprene, vinyl chloride, vinyl laurate, vinyl versatate, vinyl acetate, and blends, copolymers, or terpolymers thereof.

The present invention further provides a dry formulation for a marking material for concrete or asphalt applications wherein the retroreflective agent filler is selected from the group consisting of glass beads, glass bubbles, glass flakes, glass spheres, ceramic spheres, plastic beads, fluorescent glass beads, fluorescent plastic beads, and mixtures thereof, wherein the retroreflective filler has an average particle topsize of at least about 600 microns.

In a preferred embodiment, the cementitious marking material is formulated to include both integral and surface retroreflective/reflective agents to ensure visibility as the surface wears with time.

In a preferred embodiment, the dry cementitious formulation includes at least one of an inorganic pigment, organic pigment, or inorganic/organic hybrid pigment. The pigment can be natural or synthetic.

The dry formulation of the present invention is capable of being applied to a pavement, highway or the like, by mixing with water on site and applying as a thin coating on the surface or as a thicker topping that becomes integral with the highway surface. The marking material, when applied to the highway or pavement, preferably has broadcast onto and embedded into its surface, additional retroreflective agents.

The present invention therefore provides a dry formulation for a cementitious marking material for concrete or asphalt, compatabilized for accepting retroreflective agents comprising a cementitious mixture including a hydraulic or cementitious binder, and a redispersible polymeric cement modifier.

The present invention further provides a cementitious marking material for concrete or asphalt prepared substantially onsite from a mixture of water with a dry formulation comprising a cementitious mixture including a hydraulic or cementitious binder and a redispersible polymeric cement modifier, said marking material having retroreflective agents at least partially embedded in its surface.

The present invention further provides an integrated marking material for pavement applications prepared onsite from a mixture of water with a dry formulation comprising a cementitious mixture including a hydraulic or cementitious binder, a redispersible polymeric cement modifier, a retroreflective agent filler, and preferably, a reflective agent filler.

In one embodiment, the integrated marking material of the present invention comprises a topping of at least about one eighth inch average thickness, preferably further comprising an at least partially embedded broadcast of retroreflective agent particles having a topsize of at least about 600 microns, preferably at least about 850 microns, at the surface of the topping.

In another embodiment, the integrated marking material of the present invention comprises a coating of less than about one quarter inch average thickness, preferably further comprising an at least partially embedded broadcast of retroreflective agent particles having a topsize of at least about 600 microns, preferably at least about 850 microns, at the surface of the coating.

In a preferred embodiment, the cementitious marking material is applied in a recessed groove or depression to make it an integral part of the substrate and to prolong its service life.

In a preferred embodiment, the integrated marking material includes at least one of a natural or synthetic inorganic pigment, organic pigment, or inorganic/organic hybrid pigment.

In an alternative embodiment, the present invention provides a dry formulation for an integrated retroreflective marking material for concrete or asphalt applications comprising a mixture including a hydraulic binder of at least one of magnesium phosphate cement and magnesium potassium phosphate cement, a retroreflective agent filler, and optionally, a reflective agent filler, as well as an integrated, retroreflective marking material for pavement applications prepared substantially onsite from a mixture of water with said dry formulation.

The present invention further provides an integrated retroreflective marking material for concrete or asphalt applications comprising a surface including a hydraulic binder of at least one of magnesium phosphate cement and magnesium potassium phosphate cement, having an at least partially embedded broadcast of retroreflective agent particles having a topsize of at least about 600 microns at the surface.

DETAILED DESCRIPTION OF THE INVENTION

In order to provide a marking material for pavement applications such as for roads and highways, floors such as warehouse floors, sidewalks, toll booths, handicap spaces, parking lots, parking garages and parking decks, airfield runways and the like, that would be simple to apply, yet would last substantially for the lifetime of the pavement surface, it was necessary to develop a material that could be easily prepared onsite, and would have uniform properties throughout the application. The material would also need to exhibit structural integrity and strength substantially comparable to the pavement to which it was applied, and provide visibility both during the day and at night. The material would preferably exhibit retroreflectivity of vehicle headlamps that was substantially comparable to existing temporary marking materials such as paints and reflective tape.

I have developed such a marking material, particularly in the form of an easy to prepare, store and transport, dry formulation comprising a cementitious mixture including a hydraulic or cementitious binder, and a dry or powdered redispersible polymeric cement modifier. In a preferred embodiment, the cementitious mixture includes a retroreflective agent filler, and preferably, a reflective agent filler.

In the dry formulation, the hydraulic or cementitious binder is a hydraulic cement, preferably a portland cement such as that used for highway, bridge, or airfield runway construction, and the like, or quick setting cementitious binders such as magnesium phosphate or magnesium potassium phosphate cement, or any other suitable hydraulic binder. Suitable portland cements for use as the cementitious binder include Type I, Type II, Type III, Type IV and Type V portland cements. For specific marking applications, a white portland cement or a gray cement binder may be used. Other hydraulic or cementitious binders useful in the present invention include calcium sulfoaluminate (CSA) cements, such as type K cement, DENKA™ cement, ROCKFAST™ cement or ULTIMAX™ crystal modified portland cement and calcium aluminate cements such as SECAR™ calcium aluminate cement, high alumina cements, activated fly ash, activated clay, and slag cements.

An important ingredient in the dry formulation for the cementitious integrated marking material is a redispersible polymeric cement modifier, namely a dry polymer. By "redispersible polymer" is meant a solid grade latex, such as is produced by spray drying a latex emulsion. When water is added to the dry polymer, it redisperses back to a latex emulsion. Examples of polymers which can be utilized as dry redispersible polymers include, but are not limited to, acrylates, methacrylates, ethylene vinyl acetate, styrene-acrylate, styrene-butadiene, polyvinyl acetate, acrylonitrile-butadiene, polychloroprene, vinyl chloride, vinyl laurate, vinyl versatate, vinyl acetate, and blends, copolymers, or terpolymers of these polymers. Preferably, the redispersible polymeric cement modifier is a dry acrylic polymer.

Examples of preferred redispersible polymeric modifier for use in the permanent marking material dry formulation include, but are not limited to DRYCRYL DP2903 or DP2904 acrylic polymer available from Rohm & Haas, ACRONAL S 420P flexible styrene acrylate polymer available from BASF, VINNAPAS SP-102 acrylic polymer or VINNAPAS SP-490 vinyl chloride polymer available from WACKER Polymer Systems and SB powder styrene butadiene polymer available from Rhodia.

The polymer cement modifier is useful to compatabilize the cementitious material with the retroreflective, and reflective fillers that are used in the marking material, but should not be present in amounts that would unfavorably diminish the strength of the resulting concrete material. The polymer cement modifier is therefore preferably present in the amount of about 0.2 to about 10% by weight of the dry formulation, preferably about 0.5 to about 8% by weight of the dry formulation when the binder is portland cement, and most preferably about 2 to about 6% by weight. The relatively low percentage of the polymeric cement modifier needed for the dry formulation according to the present invention, avoids the problems attendant with the incorporation of a large proportion of polymer in cementitious materials.

When the hydraulic binder is a quick setting cement such as magnesium phosphate or magnesium potassium phosphate, the polymeric cement modifier is preferably used in the amount of about 0.2 to about 2% by weight of the dry formulation. I have found that in contrast to the portland cement binder based formulations, that the magnesium phosphate or magnesium potassium phosphate binder based formulations having acceptable performance, may have incorporated or embedded in them, retroreflective agent filler and optionally reflective agent filler, without the polymeric cement modifier, or at least, with lower levels of the polymeric component.

As stated above, the polymeric cement modifier should be dry, such as in powder form, so as to provide ease of handling, measuring, and mixing in the dry cementitious formulation, and to avoid separation and resulting pockets of low strength materials in the final topping or coating product.

The dry formulation can contain other customary components of cementitious mixtures, such as aggregate, including fine aggregate or sand, and preferably also coarse aggregate, such as silica, quartz, crushed rounded marble, glass spheres, granite, limestone, calcite, feldspar, alluvial sands, other durable aggregate, mixtures of aggregate and the like.

The dry formulation can include various admixtures useful in cementitious mixtures, such as a dispersant, a plasticizer, or a water reducer, and/or one or more other common admixtures as needed for the particular application and environment, such as an accelerator, an air entrainer, a defoamer, fibers, an inert filler, a natural clay, a pozzolanic filler, a retarder, a rheology modifier, such as a water soluble gum or polymer, a shrinkage compensating agent, a synthetic clay, a suspending agent, a thickening agent, and the like, and mixtures of the foregoing. Suitable examples of these admixtures are known to those skilled in the art, and representative examples are listed in U.S. Pat. No. 5,728,209, incorporated herein by reference.

For durability considerations, the marking material dry formulation may include a pozzolanic filler such as fly ash, kaolin, silica fume, blast furnace slag, calcined clay and the like, and mixtures of such fillers. Other inert fillers can be included, such as calcium carbonate, ceramic microspheres, mica, talc, silica flour, diatomaceous earth, rice husk ash, and the like, and mixtures of these fillers.

In order that the marking material provide visibility at night or in other low light conditions, the dry formulation preferably contains a retroreflective agent filler, such as glass beads, glass bubbles, glass spheres, ceramic spheres, plastic beads, fluorescent glass beads, fluorescent plastic beads and the like, and mixtures of these retroreflective agents, for incorporation into the matrix of the cementitious topping or coating materials. To provide retroreflective properties throughout the life of the pavement to which the integrated marking material is applied, the incorporated, or integral, retroreflective agent has an average topsize of at least about 600 microns, preferably about 850 microns and up. The topsize of the retroreflective agent is limited only by availability and ease of incorporation into and mixing with the other components of the cementitious formulation.

Although it is preferred that the retroreflective agent fillers be introduced into the dry formulation at an early stage, such as during blending of the cementitious topping, it is within the scope of the invention that the retroreflective agents be introduced, with mixing, into the dry mixture of the cementitious binder, polymeric cement modifier, etc., at any time prior to the addition of liquid to the formulation. This can be accomplished, for example, by combining the preproportioned contents of a bag of the retroreflective agent and the contents of a container of the cementitious binder mixture at a job site, prior to adding the aqueous hydration liquid.

To provide improved dispersibility in the dry formulation, the retroreflective agent filler preferably has a surface treatment or a coating of a moisture proof, antistatic agent, examples of which include but are not limited to silicones, modified silicones such as alkylhydroxy silicones, carbinols, silanols, and the like.

To provide improved adhesion in the cementitious mixture upon hydration and drying, the retroreflective agent preferably has a surface treatment or coating of an adhesion promoter. Examples of such adhesion promoters include but are not limited to silanes and modified silanes, such as those containing functionalities selected from amino, vinyl, acrylic, alkoxy, alkyl, (meth)acryloxy, glycidoxy, methacryl, epoxy, acetoxy, methoxy, ethoxy, arylalkoxy, chloro, mercapto, carboxyamide, and the like.

Retroreflectivity refers to the process of reflection in which the incident rays and reflected rays are antiparallel. For example, a beam of an auto or aircraft headlamp that shines on the retroreflective agent is reflected back toward the source, being then visible to a driver or pilot. Not all reflective materials, and not all glass spheres are retroreflective. For glass spheres and the like, the minimum size to promote the optimum dry and wet night-time visibility is about 600 microns. Therefore, glass spheres that have formerly been incorporated into concretes as inert fillers, have not inherently imparted retroreflectivity to the concrete. To provide optimum retroreflectivity, the retroreflective agent filler, such as glass beads, preferably has a refractive index of greater than about 1.5, preferably about 1.5 to about 2.1.

In order to enhance visibility of the marking material, the dry formulation optionally contains reflective agents as filler to reflect light from other sources, such as smaller glass beads (less than 600 micron diameter), glass bubbles, glass flakes, glass spheres, ceramic spheres, plastic beads, fluorescent glass beads, fluorescent plastic beads and mixtures of these.

In order to function as lane or runway stripes or markers for hazards or other special marked areas, such as where delineation, accenting or site/area marking is desired, the formulation for the integrated marking material according to the present invention may include at least one pigment. For example, titanium dioxide can be used for white striping, and Hansa yellow for the yellow "No Passing Zone" striping common to our highways. A black pigment can be used to provide contrast for an adjacent or overlaid white or colored material stripe, such as black iron oxide. For other purposes, the formulation may contain a pigment from the classes of fluorescent metal oxide pigments and phosphorescent metal oxide pigments, to create a "glow in the dark" effect.

The dry formulation may therefore contain a natural or synthetic pigment such as inorganic pigment, an organic pigment or an inorganic/organic hybrid pigment, including any suitable mixed metal oxide, dye or colorant. Such pigments include but not limited to, carbon black, Hansa yellow (2-[(4-methoxy-2-nitrophenyl)azo]-N-(2 methoxy phenyl)-3-oxo butanamide), chrome oxide, iron oxide, titanium dioxide, zinc sulfate, zinc sulfides, LumiNova™ modified zinc sulfide (United Minerals Corp.), Lithopone zinc sulfide/barium sulfate, zinc oxide, titanates, nickel antimony titanates, phthalocyanines, mixed phase spinels and oxides, and mixtures of these, or any pigment meeting the requirements listed in ASTM specification C-979. The marking material of the present invention can therefore be tailored, in color and consistency, to meet special aesthetic or design needs.

The dry formulation generally contains the above described components in the following ranges, set forth in weight percents based on the total weight of those components listed: binder, about 15 to about 50%; redispersible polymer, about 0.2 to about 10%; retroreflective agent, about 10 to about 75%; reflective agent, about 5 to about 35%; aggregate, about 10 to about 70%; pigment, up to about 10%.

The relative proportions of the components are varied according to the requirements of the particular application, for example, as a thick topping or a thin coating, to fresh or hardened concrete, or to asphalt, and the end use performance characteristics desired in terms of strength and durability.

The integrated marking material for pavement applications, according to the present invention, is prepared onsite from a mixture of water with the dry formulation described above. The measurement of the dry formulation mix, and a quantity of water, is easier and more accurate than the calculation of a solids-containing solution or dispersion of uncertain concentration, together with the need to compatibly and uniformly mix the same. Of course, it is within the scope of the invention to include components in solution in the water that are not readily phase separable or critical in terms of absolute percentage to the dry formulation mixture, such as dispersants, plasticizers, water reducers, accelerators, air entrainers, defoamers, retarders, rheology modifiers, shrinkage compensating agents, suspending agents, thickening agents and the like.

The water cement ratio for the marking material is selected according to considerations known in the art for the particular binder utilized, generally ranging between about 0.22 and about 0.65.

The marking material of the present invention is therefore advantageous in that it can be stored and transported as a dry formulation and can be mixed with water onsite for easy application to the fresh or hardened concrete or asphalt pavement such as a road or highway.

The area to be marked can be prepared in a variety of ways. By one technique, the marking material can be applied as a topping comprising a mixture of water and the dry formulation to a freshly laid concrete surface, preferably in a slight depression as compared to the contiguous pavement surface, so that the marking material fills the depression to form an area having a surface approximately even with, or slightly elevated with respect to the contiguous pavement.

By another technique, the marking material topping is applied to a cured or hardened pavement surface, that has been prepared with a depression to receive the topping, or in which the depression has been subsequently formed, or cut.

By still another technique, a coating comprising a mixture of water and the dry formulation is applied to a pavement, such as an asphalt or a hardened or precast concrete surface, without the need for first preparing a ridge or depression to receive the marking material.

Techniques and equipment for applying the integrated marking materials of the present invention are also described in U.S. Provisional Patent Application No. 60/083,786 filed May 1, 1998, and its corresponding regular patent application U.S. Ser. No. 09/302,831, filed Apr. 30, 1999, now U.S. Pat. No. 6,213,680 entitled Apparatus and Method for Integrated Pavement Marking.

The marking material of the present invention, when applied as a thick topping according to the techniques described generally above, is of at least about one eighth inch average thickness, and is preferably one quarter inch or greater.

The marking material of the present invention, when applied as a thin coating according to the techniques described generally above, is generally less than about one quarter inch average thickness, preferably less than about one eighth inch in thickness. It is preferred, when the marking material is to be applied as a thin coating, that the percentage of redispersible polymeric cement modifier in the dry formulation be greater than that of a corresponding topping formulation, most preferably on the order of about 4 to about 8 percent by weight based on the total dry formulation.

Whether applied as a thin coating or a thick topping, in order to enhance the retroreflectivity of the marking material, the material is preferably seeded with retroreflective agents, and optionally, reflective agents, such as being broadcast on the surface prior to setting of the cementitious marking material. Suitable retroreflective agents and reflective agents are listed above, being selected from those which are capable of being incorporated integrally in the matrix of the cementitious material by formulation in the dry mix.

The marking materials of the present invention, therefore include an at least partially embedded broadcast of retroreflective filler particles having a topsize of at least about 600 microns at the surface of the topping or coating. Preferably, the retroreflective filler particles have a topsize of at least about 850 microns. Optionally, a clear coat may be applied over the broadcast particles, such as an acrylic resin or a polyurethane coating.

It has been found that the consistency of the cementitious material applied to the pavement, at the time of the seeding of the retroreflective or reflective particles, affects the depth to which the particles sink into the material, and thus the percentage of the individual particles which are embedded into the matrix. Generally, the higher the percentage of the exposed particles, the higher the initial retroreflectivity or reflectivity of the marking material. However, even a small percentage of exposed retroreflective agents, provides an acceptable reflective performance.

With wear of the pavement (and marking material) surface, both the surface embedded retroreflective agents and the retroreflective fillers incorporated in the matrix of the marking material become exposed, and perform the desired function of low light or night reflectivity or visibility. Visibility in light environments is also enhanced by the presence of the retroreflective agents. The permanence of the integrated cementitious topping or coating marking materials as compared with conventional paint or tapes is thus demonstrated.

The marking material is a cementitious material having high strength, such as compressive, tensile and flexural strength similar to the concrete pavement, with retroreflective fillers at the surface and preferably throughout the matrix for "replenishment" of the surface as the surface of the marking material abrades together with the contiguous pavement. The marking material has a setting time approximately equal to concrete, and a volume stability and thermal expansion compatible with concrete. Similarly to concrete, the marking material is resistant to UV light and to de-icing salts. The incorporated polymer provides enhanced bonding to the integral particles, and also to the substrate pavement.

Specific Embodiments of the Invention

EXAMPLE 1

A sample mixture of a fast setting magnesium phosphate, white cementitious topping was prepared according to the present invention. Sample panels of the mixed topping were cast and allowed to harden, then retroreflectivity measurements were taken using a portable 30 meter geometry retroreflectometer. Two sample panels were cast to compare the retroreflectivity of a sample sealed with a clear acrylic sealer versus an unsealed sample of the topping.

| Topping Formulation | Weight Percent |
| --- | --- |
| Silica Sand | 26.30 |
| Silica Flour (140 mesh silica sand) | 20.00 |
| Magnesium Oxide | 8.50 |
| Mono Ammonium Phosphate | 8.50 |
| Sodium Tripolyphosphate | 0.80 |
| Boric Acid | 0.50 |
| Titanium Dioxide | 3.50 |
| Acrylic Polymer | 0.80 |
| Defoamer | 0.10 |
| 16–18 Mesh Glass Beads (Visa-Bead L-511) | 31.00 |
| Percent Mix Water | 10.75 |
| Mix time, minutes | 3.0 |
| Flow, inches (2" × 4" cylinder) | 5.75 |
| Final Set, hrs. | 1.0 |
| Retroreflectivity, mcd/lux/m$^2$ | |
| Sealed | 691 |
| Unsealed | 698 |

EXAMPLE 2

Samples of dry formulation cementitious marking material mixtures were prepared with incorporation of varying amounts of retroreflective glass beads into the formulation. The glass beads used were soda-lime, with refractive index 1.5–1.52 or greater. FLEXOLITE BT-3 glass beads is an example of suitable glass beads.

| Marking Material Formulation | Mix 1 | Mix 2 | Mix 3 |
|---|---|---|---|
| 50 mesh white silica sand | 23.8 | 12.5 | 20.1 |
| Glass Beads (20/30 mesh) | 24.0 | 37.8 | 30.2 |
| 1/8" Glass flakes | 2.5 | — | — |
| Titanium dioxide | 3.5 | 3.5 | 3.5 |
| Acrylic-Polymer | 0.7 | 0.7 | 0.7 |
| Melamine water reducer | 0.3 | 0.3 | 0.3 |
| Defoamer | 0.2 | 0.2 | 0.2 |
| Calcium Carbonate | 10.0 | 10.0 | 10.0 |
| White Type 1 Portland cement | 35.0 | 35.0 | 35.0 |
|  | 100.0 | 100.0 | 100.0 |
| Percentage Water Added | 20.0 | 15.0 | 16.0 |
| Consistency | screedable | screedable | screedable |

All percentages are by weight. Concrete beams were cast from the following concrete mixture using freeze-thaw molds. The cementitious marking material formulations were placed over the concrete 15 to 30 minutes after screeding.

| Concrete Mixture | Weight Percent |
|---|---|
| Medusa Type I | 14.85 |
| Stone (3/8" and 1/2") | 47.77 |
| Sand | 37.38 |
| Water/cement ratio | 0.40 |

All three mixes exhibited stiffening approximately 5–10 minutes after mixing. Mixes screened off fine, and were not sticky.

A light test was conducted on the composite beam from Mix 1. The surface of one half of the beam was screened to expose the interior matrix, approximating a worn roadway. The reflectance of the as cast and exposed concrete beam was compared with a standard pavement marking tape.

Comparison of Composite Beam from Mix 1 to Striping Tape

|  | Test 1 | Test 2 |
|---|---|---|
| Luminance |  |  |
| Reference Standard | 3.76 |  |
| Striping Tape (3M - STAMARK L420) | 3.44 | 3.47 |
| Composite Beam (surface ground to expose integral beads) | 3.36 | 3.32 |
| Composite Beam (as cast with integral beads) | 3.47 | 3.41 |
| Reflectance % |  |  |
| Striping Tape (3M - STAMARK L420) | 92.0% |  |
| Composite Beam (surface ground to expose integral) beads) | 89.0% |  |
| Composite Beam (as cast with integral beads) | 91.5% |  |

The as cast, integrated marking material provided luminance values and reflectance percentages substantially equal to the standard pavement marking tape. The simulated worn pavement, with the glass beads incorporated throughout the matrix, showed little decrease in reflectance.

EXAMPLE 3

Samples of dry formulation integrated marking material cementitious mixtures were prepared with both reflective glass flakes and retroreflective glass beads incorporated into the formulation. Percentages are reported by weight.

| Marking Material Formulation | Mix 1 | Mix 2 | Mix 3 | Mix 4 |
|---|---|---|---|---|
| White Silica Sand (50 mesh) | 30.00 | 35.20 | 35.40 | 30.40 |
| 1/64" glass flakes | 5.00 | 5.00 | 5.00 | 5.00 |
| Glass beads 20/30 mesh (FLEXOLITE BT-3) | 15.00 | 15.00 | 15.00 | 15.00 |
| Titanium dioxide | 3.50 | 3.50 | 3.50 | 3.50 |
| Melamine water reducer | 0.60 | 0.40 | 0.20 | 0.20 |
| Defoamer | 0.20 | 0.20 | 0.20 | 0.20 |
| Acrylic-Polymer | 0.70 | 0.70 | 0.70 | 0.70 |
| Calcium hydroxide | — | 5.00 | — | — |
| Silica flour | — | — | — | 15.00 |
| White silica sand (100 mesh) | 10.00 | — | — | — |
| White Type I cement | 35.00 | 35.00 | 40.00 | 30.00 |
|  | 100.00 | 100.00 | 100.00 | 100.00 |
| Percentage Water Added | 17.0 | 18.0 | 18.0 | 22.0 |
| Consistency | bleed | stiffened |  | sl. Stiffened |

Mix time was four (4) minutes each.

A composite beam was cast using Mix 4 marking material overlayed on the following fresh concrete at 30 minutes after placement.

| Concrete Mix | Weight Percent |
|---|---|
| Medusa Type I | 14.67 |
| Concrete sand | 37.46 |
| Concrete stone | 47.87 |
| Water/cement ratio | 0.40 |

A light test was conducted on the composite beam from Mix 4. The surface of one half of the beam was screened to expose the interior matrix, approximating a worn roadway. The reflectance of the as cast and exposed concrete beam was compared with a standard pavement marking tape.

Comparison of Composite Beam from Mix 4 to Striping Tape

| Luminance |  |
|---|---|
| Reference Standard | 3.36 |
| Highway Striping Tape - (3M STAMARK L420) | 3.11 |
| Highway Striping Tape - Notched (3M - STAMARK L380I) | 2.78 |
| Composite Beam | 2.82 |
| Reflectance % |  |
| Highway Striping Tape (3M - STAMARK L420) | 92.6% |
| Highway Striping Tape - Notched (3M - STAMARK L380I) | 82.7% |
| Composite Beam | 84.0% |

The integrated, cementitious marking material of the present invention exhibited a reflectance of within 10% of the standard highway striping tape, and a reflectance greater than that of a notched highway striping tape.

EXAMPLE 4

Testing was conducted of the compressive strength of an integrated cementitious marking material according to an embodiment of the invention.

| Marking Material Formulation | Weight Percent |
| --- | --- |
| Silica Sand | 22.85 |
| 1/64" glass flakes | 2.00 |
| Glass beads 20/30 mesh (FLEXOLITE BT-3) | 20.00 |
| Titanium dioxide | 3.50 |
| Defoamer | 0.10 |
| Polymer | 1.20 |
| Melamine | 0.35 |
| Silica flour (140 mesh silica sand) | 10.00 |
| White Type I Cement | 40.00 |
|  | 100.00 |
| Percentage Water (by weight) | 18.0 |
| Consistency | patching |

Mix time four (4) minutes

The mix was flowable until the last 3.5 minutes of mix time, at which time it then stiffened. A composite beam was cast from the following concrete mix, with a coating of ¼ inch thickness over the fresh concrete, approximately 30 minutes after mixing of the marking material formulation with water.

| Concrete Mix | Weight Percent |
| --- | --- |
| Medusa Type I Cement | 14.67 |
| Concrete sand | 37.46 |
| Concrete stone ½" | 47.87 |
| Water/cement ratio | 0.40 |
| Slump | 2 inches |

The compressive strength value of the cementitious, integrated marking material is set forth below.
Compressive Strength (ASTM C-109)

|  | 1-Day | 7 Days | 14 Days | 28 Days |
| --- | --- | --- | --- | --- |
| psi | 3067 | 5573 | 6285 | 7300 |
| MPa | 21.1 | 38.4 | 43.3 | 50.3 |

EXAMPLE 5

Samples of dry formulation cementitious marking material mixtures were prepared with the incorporation of VISABEAD L-511 and VISABEAD E-16 retroreflective glass beads obtained from Potters Industries, Inc. VISABEAD L-511 beads are surface treated with an adhesion promoter, namely a silane with amino and vinyl functionalities. These permit it to crosslink with cementitious formulation components. Both the VISABEAD E-16 and VISABEAD L-511 beads behave similarly in the cementitious mixture, except that the topsize of the VISABEAD E-16 bead is larger.

|  | Weight Percent | |
| --- | --- | --- |
| Marking Material Formulation | Mix 1 | Mix 2 |
| Silica Sand | 13.35 | 13.35 |
| ⅛" glass flakes | 2.00 | 2.00 |
| 16–18 mesh glass beads (VISABEAD L-511) | 30.00 | — |
| 14–16 mesh glass beads (VISABEAD E-16) | — | 30.00 |
| Titanium dioxide | 3.50 | 3.50 |
| Defoamer | 0.15 | 0.15 |
| Acrylic-Polymer | 0.70 | 0.70 |
| Melamine water reducer | 0.30 | 0.30 |
| Silica flour (140 mesh silica sand) | 10.00 | 10.00 |
| White Type I cement | 40.00 | 40.00 |
|  | 100.00 | 100.00 |
| Percentage of Water Added | 16.0 | 16.0 |
| Consistency | flowable | flowable |

Mix time was three (3) minutes for each.

Mix 2 remained flowable longer than Mix 1. Composite beams were cast over the concrete mixtures described below, approximately 30 minutes after mixing the concrete. The longer workability observed with Mix 2 is thought to be caused by a surface area effect.

| Concrete Mix | Weight Percent |
| --- | --- |
| Medusa Type I | 14.67 |
| Concrete sand | 37.46 |
| Concrete stone | 47.87 |
| Water/cement ratio | 0.41 |

EXAMPLE 6

Samples of dry formulation cementitious marking materials having incorporated retroreflective glass beads were cast in petri dishes, and the surface was stamped to create a ridged, textured profile.

|  | Weight Percent | |
| --- | --- | --- |
| Marking Material Formulation | Mix 1 | Mix 2 |
| Silica Sand (30/50 mesh) | 13.85 | 13.85 |
| ⅛" glass flakes | 1.50 | 1.50 |
| 16–18 mesh glass beads (VISABEAD L-511) | 30.00 | — |
| Titanium dioxide | 3.50 | 3.50 |
| Acrylic-Polymer | 0.70 | 0.70 |
| Defoamer | 0.15 | 0.15 |
| Melamine water reducer | 0.30 | 0.30 |
| Silica flour | 10.00 | 10.00 |
| 20/30 mesh glass beads (FLEXOLITE BT-3) | — | 30.00 |
| White Type I cement | 40.00 | 40.00 |
|  | 100.00 | 100.00 |
| Percentage Water | 16.0 | 17.0 |
| Consistency | flowable | flowable |

Mix time was three (3) minutes for each.
Stamping Procedure

Approximately 30 minutes after mixing, the surface of the petri dish samples were stamped using a square pattern branding pad to create a textured surface. After stamping the surface, a 1/16 inch ridge was created.

The surface of each stamped sample was screened using a 120 mesh carbide screen to expose the incorporated integral glass beads as on a worn roadway. The samples were checked qualitatively for retroreflection using a standard flashlight. Samples were placed on the floor in a dark room and the light was projected onto the surface. The areas where the beads were exposed exhibited retroreflection on contact with light. The reflectivity was similar to the STAMARK L380I notched tape from 3M, but not quite as pronounced.

EXAMPLE 7

An integrated cementitious marking material formulation was prepared with an increased polymer level, to determine if improved surface integrity would result.

| Marking Material Formulation | Mix Weight Percent |
|---|---|
| Silica Sand (30/50 mesh) | 10.50 |
| 1/8" glass flakes | 2.00 |
| 16–18 mesh glass beads (VISABEAD L-511) | 30.00 |
| Titanium dioxide | 5.00 |
| Acrylic-Polymer | 4.00 |
| Melamine water reducer | 0.30 |
| Silica flour | 8.00 |
| Defoamer | 0.20 |
| White Type I cement | 40.00 |
|  | 100.00 |
| Percentage Water | 17.0 |
| Consistency | flowable |

Mix time was three (3) minutes.

The surface of the cast petri dish pat was hard. Screening was difficult due to improved density and hardness of the surface. The carbide screen (120 mesh) used, was able to abrade the surface more easily after the initial layer of paste was removed. The increased polymer level improved the surface quality. A sample was cast in a petri dish with a surface retarder applied at stiffening produced a good exposure of the beads. The use of a surface retarder as a chemical texturizer retards the hydration of cement at the surface to obtain the desired exposure of the profile of the beads. This could optionally be employed to enhance reflection.

EXAMPLE 8

An expansive agent was incorporated in the mix to compensate for shrinkage, and an air entrainer for freeze-thaw resistance. Samples were prepared and tested for retroreflectivity.

|  | Weight Percents | | | |
|---|---|---|---|---|
| Marking Material Formulation | Mix 1 | Mix 2 | Mix 3 | Mix 4 |
| Silica sand | 16.34 | 19.34 | 14.34 | 18.84 |
| 140 mesh Silica Sand | 10.00 | 10.00 | 10.00 | 10.00 |
| Defoamer | 0.10 | 0.10 | 0.10 | 0.10 |
| Melamine water reducer | 0.30 | 0.30 | 0.30 | 0.30 |
| Acrylic-Polymer | 1.75 | 1.75 | 1.75 | 1.75 |
| 16–18 mesh glass beads (VISABEAD L-511) | 30.00 | 30.00 | 30.00 | 30.00 |
| Calcium oxide | 2.50 | 2.50 | 2.50 | --.-- |
| Air entrainer | 0.01 | 0.01 | 0.01 | 0.01 |
| 1/64" glass flakes | --.-- | --.-- | --.-- | --.-- |
| Titanium dioxide | 4.00 | --.-- | --.-- | 4.00 |
| Black iron oxide | --.-- | --.-- | 6.00 | --.-- |
| Yellow pigment | --.-- | 1.00 | --.-- | 35.00 |
| White Type I cement | 35.00 | 35.00 | --.-- | --.-- |
| Gray Type I cement | --.-- | --.-- | 35.00 | --.-- |
|  | 100.00 | 100.00 | 100.00 | 100.00 |
| Percentage Water | 14.0 | 14.0 | 17.0 | 15.0 |
| Consistency | leveling | leveling | patching | screedable |

Mix time was four (4) minutes for each
Composite Beams

Marking material from each mix was cast over concrete beams at 1/4 inch thickness approximately 30 to 60 minutes after screeding the concrete. The surface of the concrete was raked prior to application of the marking material. Concrete beams were cast in a 2"×2"×10" length change mold from the concrete mix set forth below. Approximately 5 to 10 minutes after placing the coating over the concrete, a layer of the glass beads was applied by broadcasting the beads onto the surface of the coating from each mix at a rate of approximately 0.02 pounds per linear foot.

| Concrete Mix | Weight Percent |
|---|---|
| Medusa Type I | 14.67 |
| Concrete sand | 37.46 |
| Concrete stone | 47.87 |
| Water/cement ratio | 0.385 |

A retroreflection test conducted with a standard flashlight exhibited good retroreflection of the light beam. The depth of bead penetration determined the degree of retroreflection. The more the beads were exposed, the greater the entrance of light that was permitted and the greater the subsequent retroreflection that was exhibited.

EXAMPLE 9

An integrated cementitious marking material was prepared, incorporating an expansive agent and an air entraining agent. Silica flour was replaced with 100 mesh silica sand.

|  | Weight Percent | |
|---|---|---|
| Marking Material Formulation | Mix 1 - white | Mix 2 - yellow |
| Silica sand | 20.94 | 23.44 |
| 100 mesh Silica Sand | 10.00 | 10.00 |
| 16–18 mesh glass beads (VISABEAD L-511) | 26.00 | 26.00 |
| Titanium dioxide | 3.50 | --.-- |
| Defoamer | 0.10 | 0.10 |
| Acrylic-Polymer | 1.75 | 1.75 |
| Air entrainer (SILIPON RN6031) | 0.01 | 0.01 |
| Melamine water reducer | 0.20 | 0.20 |
| Calcium oxide | 2.50 | 2.50 |
| White Type I cement | 35.00 | 35.00 |
| Yellow pigment (HANSA DCC1103) | --.-- | 1.00 |
|  | 100.00 | 100.00 |
| Percentage of Water Added | 13.0 | 16.8 |
| ASTMC 230 Percentage Flow (5 drops) | 73.0 | 74.0 |
| Unit Weight | 135 lb/ft$^3$ | 130 lb/ft$^3$ |
| Consistency | patching | patching |

| Concrete Mix | Weight Percent |
|---|---|
| Medusa Type I | 14.67 |
| Concrete sand | 37.46 |
| Concrete stone | 47.87 |
| Water/cement ratio | 0.409 |

The above concrete mix was cast into 4"×16'×3" molds half hour prior to mixing cementitious marking topping. The surface of the concrete was raked in crossed sections. The topping was placed and screeded to approximately 1/8 inch thickness. Both mixes stiffened more than usual, less flow was obtained. Glass beads, 16–18 mesh (VISABEAD L-511), were broadcast on the surface of each beam at a rate of 0.10 pounds per linear foot. Because of the stiffer consistency, the samples were vibrated to facilitate bead penetration.

A retroreflection test conducted with light shown from a standard flashlight exhibited good retroreflectivity of the light beam. Retroreflectivity was equal to or better than retroreflectivity of the corresponding color of 3M STAMARK L420 plain tape, and 3M STAMARK L380I notched tape.

The compressive strength of the resulting topping was tested by ASTM-C109 at seven (7) days, with the results as shown below.

| Compressive Strength at 7 days | Mix 1 | Mix 2 |
|---|---|---|
| psi | 7605 | 5916 |
| MPa | 52.5 | 40.8 |

EXAMPLE 10

Samples of integrated marking material, having both incorporated and surface broadcast retroreflective beads, were prepared for retroreflectivity testing.

| | Weight Percent | | |
|---|---|---|---|
| Marking Material Formulation | Mix 1 (white) | Mix 2 (white) | Mix 3 (yellow) |
| Silica sand | 16.84 | 16.84 | 19.34 |
| 100 mesh Silica Sand | 10.00 | 10.00 | 10.00 |
| 16–18 mesh glass beads (VISABEAD L-511) | 30.00 | 30.00 | 30.00 |
| Titanium dioxide | 3.50 | 3.50 | --.-- |
| Defoamer | 0.10 | 0.10 | 0.10 |
| Acrylic-Polymer | 1.75 | 1.75 | 1.75 |
| Air entrainer (SILIPON RN6031) | 0.01 | 0.01 | 0.01 |
| Melamine water reducer | 0.30 | 0.30 | 0.30 |
| Calcium oxide | 2.50 | 2.50 | 2.50 |
| White Type I cement | 35.00 | 35.00 | 35.00 |
| Yellow pigment (HANSA DCC1103) | --.-- | --.-- | 1.00 |
| | 100.00 | 100.00 | 100.00 |
| Percentage Water Added | 14.0 | 13.0 | 17.0 |
| Flow, inches (2 inch by 4 inch cylinder) | 10.5 | 10.0 | 3.0 |

Mix time was three (3) minutes for each mix.
Sample Preparations

The marking material was poured into petri dishes. Additional glass beads, 16–18 mesh (VISABEAD L-511), were broadcast on the surface of each pat at a rate of 0.10 pounds per linear foot. The degree to which the beads sunk into the cementitious material was found to be based on consistency of the cementitious mix.

Mix 1—beads sunk approximately 90% into mix.
Mix 2—beads sunk approximately 75% into mix.
Mix 3—beads sunk approximately 75% into mix.

Retroreflection tested with a standard flashlight confirmed that the depth of penetration of the broadcast layer of beads determined the level of retroreflection. Mix 2 exhibited higher reflectivity (visually) as compared to Mix 1. However, even the 90% sunk sample of Mix 1 showed acceptable reflectivity compared to the corresponding color of 3M STAMARK L420 plain tape and 3M STAMARK L380I notched tape.

EXAMPLE 11

Additional samples of cementitious marking material having both incorporated and broadcast retroreflective beads, were prepared for retroreflectivity testing.

| | Weight Percent | | |
|---|---|---|---|
| Marking Material Formulation | Mix 1 (white) | Mix 2 (yellow) | Mix 3 (black) |
| Silica Sand | 16.94 | 19.39 | 16.24 |
| 140 mesh Silica Sand | 10.00 | 10.00 | 10.00 |
| 16–18 mesh glass beads (VISABEAD L-511) | 30.00 | 30.00 | 30.00 |
| Defoamer | 0.10 | 0.10 | 0.10 |
| Black iron oxide pigment | --.-- | --.-- | 4.00 |
| Air entrainer | 0.01 | 0.01 | 0.01 |
| Melamine water reducer | 0.20 | 0.25 | 0.40 |
| Calcium oxide | 2.50 | 2.50 | 2.50 |
| Yellow pigment (HANSA DCC1103) | --.-- | 1.00 | --.-- |
| Acrylic-Polymer | 1.75 | 1.75 | 1.75 |
| White Type I cement | 35.00 | 35.00 | --.-- |
| Type II cement | --.-- | --.-- | 35.00 |
| Titanium dioxide | 3.50 | --.-- | --.-- |
| | 100.00 | 100.00 | 100.00 |
| Percent Water | 15.0 | 16.0 | 18.0 |
| Flow, inches | 7.5 | 9.125 | 7.0 |

Mix time was four (4) minutes for each mix.
Mix 1 stiffened approximately 10 minutes after mixing.
Mix 2 remained workable for several hours.

Samples of the cementitious marking materials were cast in petri dishes, and glass beads, 16–18 mesh (VISABEAD L-511), were broadcast on the surface of each pat at a rate of 0.10 pounds per linear foot.

EXAMPLE 12

Formulations of yellow and white cementitious marking coating materials with water proofing properties were prepared and tested, with broadcast glass flakes and glass beads.

| Marking Material Coating Formulation | Mix 1 (white) | Mix 2 (yellow) |
|---|---|---|
| 50 mesh white Silica Sand | 16.925 | 18.30 |
| 100 mesh Silica Sand | 16.925 | 18.30 |
| Sodium oleate | 0.25 | 0.25 |
| Mixed stearates | 0.50 | 0.50 |
| Defoamer | 0.35 | 0.35 |
| Acrylic-Polymer | 6.00 | 6.00 |
| Hydrophobic aluminum silicate | 2.75 | 2.75 |
| Melamine water reducer | 0.80 | 0.80 |
| Calcium carbonate | 10.50 | 10.50 |
| Yellow pigment (HANSA DCC1103) | --.-- | 1.25 |
| Titanium dioxide | 4.00 | --.-- |
| White Type I cement | 40.00 | 40.00 |
| Wollastonite fibers (NYAD G fibers) | 1.00 | 1.00 |
| | 100.00 | 100.00 |
| Percent Water Added | 24.0 | 24.0 |
| Percent Flow (5 drops) - ASTM C230 | 108.0 | 120.0 |
| Flow, inches (2 inch by 718 inch cylinder) | 6.0 | 6.25 |

Mix time was four (4) minutes for each mix.

The consistency of Mix 1 and Mix 2 was good; however, white patches and unmixed stearates were present in Mix 2. As mixed stearates are an optional component of the coating material, they can be removed from both the white and yellow formulations.

Samples of each mix were placed over precast concrete at a thickness coating of 1/32 inch. The hardened precast concrete slab was lightly sandblasted and pre-wetted before application of the coating. One half of the coated section of both the yellow and white stripes were seeded with glass flakes (1/8") and the other with glass beads. Cover age for the beads and flakes was approximately 0.01 pounds per linear foot. The glass beads were easy to apply and the effect of their reflective properties resulted in higher visibility than the glass flakes.

EXAMPLE 13

| Formulation | Weight Percent | |
| --- | --- | --- |
| | Mix 1 | Mix 2 |
| 50 mesh silica sand | 17.76 | 20.67 |
| 100 mesh silica sand | 10.00 | 10.00 |
| 16–18 mesh glass beads (Visa Bead L-511) | 30.00 | 30.00 |
| Defoamer | 0.06 | 0.08 |
| Titanium Dioxide | 4.00 | --.-- |
| Hansa Yellow, DCC 1165 | --.-- | 1.00 |
| Melamine water reducer | 0.18 | --.-- |
| Sodium napthalene sulfonate water reducer | --.-- | 0.15 |
| Sodium carbonate | 0.15 | 0.20 |
| Calcium oxide | 0.50 | 0.50 |
| Acrylic redispersible polymer | 1.75 | 1.75 |
| Neopentyl glycol | 0.50 | 0.50 |
| White calcium aluminate cement | 0.10 | 0.15 |
| White type 1 cement | 35.00 | 35.00 |
| Percentage water added | 11.04 | 11.34 |
| Mixing time | 4 mins. | 4 mins. |
| Flow, inches (2" × 4" cylinder) | 7.75 | 7.125 |
| Unit Weight | 131 lb/ft$^3$ | 135 lb/ft$^3$ |
| Stiffening rate | 1 hr. 35 min. | 1 hr. 19 min. |
| Initial set | 1 hr. 55 min. | 1 hr. 39 min. |
| Final set | 3 hrs. 20 min. | 2 hrs. 24 min. |

The performance of certain integrated cementitious marking materials prepared in the foregoing examples was evaluated for compressive and flexural strength, splitting tensile strength and pull-off bond reported in pounds per square inch (psi) and parenthetically in megapaschals (MPa) in Table I below. Dry shrinkage of the material was tested by ASTM C-157 (modified) and reported as percent change in Table I. Specimens were moist cured for one day, then air cured for the remainder of the test. The ASTM test protocols followed for each measurement are also listed in the Table.

The test results demonstrate that the integrated cementitious marking materials of the present invention are suitable for use in roads and highways, as well as other paved surfaces such as airfield runways, parking lots, parking decks and garages, and the like. It should be understood that the examples are provided for illustrative purposes only, as further exemplification of how to make and use the marking materials of the present invention. Integrated marking materials according to the present invention can be formulated according to techniques known in the art to meet performance criteria required for specific applications.

TABLE I

Integrated Marking Material Performance

| | 1 Day | | 28 Days |
| --- | --- | --- | --- |
| Ex 13 Mix 1 (White) | Psi (MPa) | | Psi (MPa) |
| Compressive Strength | | | |
| ASTM C-109 | 2940 (20.3) | | 6727 (46.4) |
| Flexural Strength | | | |
| ASTM C-348 | 657 (4.53) | | 878 (6.0) |
| Splitting Tensile | | | |
| ASTM C-496 | 341 (2.35) | | 479 (3.3) |
| Pull-off Bond | | | |
| ASTM D-4541 | 208 (1.4) | | 233 (1.6) |
| Drying Shrinkage (% change) | 3-Days | 7-Days | |
| ASTM C157/ICRI (modified) | −0.031 | −0.058 | −0.095 |
| Ex 13 Mix 2 (Yellow) | | | |
| Compressive Strength | | | |
| ASTM C-109 | 3832 (26.4) | | 8838 (61.0) |
| Flexural Strength | | | |
| ASTM C-348 | 742 (5.1) | | 1116 (7.7) |
| Splitting Tensile | | | |
| ASTM C-496 | 360 (2.5) | | 706 (4.9) |
| Pull-Off Bond | | | |
| ASTM D-4541 | 200 (1.4) | | 283 (2.0) |
| Drying Shrinkage (% change) | 3-Days | 7-Days | |
| ASTM C157/ICRI (modified) | −0.023 | −0.047 | −0.091 |

EXAMPLE 14

Eight samples of horizontal retroreflective coatings were evaluated for retroreflective luminance according to ASTM D-4061 93b.

Five samples were selected from cementitious marking materials containing the retroreflective agent and polymeric cement modifier according to the present invention, in white, yellow and black, to be compared against 3M STAMARK L420 white and 3M STAMARK L421 yellow highway marking tapes, and a black highway marking tape from Stimsonite.

Table II below shows the retroreflected luminance data obtained for both white and yellow light sources.

The evaluation was run according to ASTM D-4061 93b. Data was obtained using Photoresearch Division of Macbeth Kollmorgen, PR-703 Spectraradiometer. Two light sources were used to generate the data. The "white or standard" lamp was a Sylvania H4703 Halogen low beam lamp. The "yellow or fog" lamp was a Blazer International C 1075K8M Halogen Fog lamp.

The samples were run at a geometry maintained at an 86° entrance angle and 0.2° observer angle geometry per the ASTM D-4061 method. Checks during measurement showed no significant variance at a constant observation angle. The final converted units are in English (millicandelas per square foot per foot-candle) or in Metric (millicandelas per square meter per lux). Numerically the results are the same.

The data in Table II presents values that compare the total reflected luminance at the test conditions with each lamp type. The last two columns apply the correction factor for size ratio by dividing the result to the left of the normalized area factor by the factor and reporting in these two columns. There is no correction applied to the reference samples since it would be 1.0 as a factor.

Based on white auto lamp source retroreflection testing Sample 1 had one half the retroreflectance of Sample 2. Compared to the 3M reference tape the Sample 2 retroreflects better. Sample 1 reflects less. Sample 1 had the broadcast retroreflective beads embedded approximately 90%, while Sample 2 had the broadcast retroreflective beads embedded approximately 50%.

The two white test samples are also different. Sample 3 has about one half the reflectance of Sample 4. Uncorrected Sample 4 is less retroreflective than the 3M reference tape sample. With the area correction factor applied, Sample 4 reflected better than the 3M reference tape sample. The black Sample 5 was larger than the Stimsonite sample evaluated. The uncorrected value of the retroreflected luminance of Sample 5 was significantly greater than the black reference tape, and corrected values were approximately equal.

Based on yellow auto fog lamp source retroreflection testing, the two yellow samples were nearly equal (Sample 1) and greater (Sample 2) than the yellow 3M reference tape sample retroreflectance coefficient. The rationalized values, modified for difference in area, were equal (Sample 1) and better (Sample 2) than the 3M yellow reference tape. The two white samples were one half (Sample 3) of the other (Sample 4) in retroreflection. Sample 4 (with no area adjustment) was equivalent to the 3M white reference tape sample. The unadjusted black sample (#5) was better than the Stimsonite sample. Adjusted for area, the two samples were equal.

Use of the integrated marking material of the present invention is more favorable than prior art tapes and paints in view of the equivalent optical performance achieved, in addition to the extended lifetime of the integrated marking material as compared to tapes and paints.

TABLE II

Retroreflected Luminance Evaluation

| Sample | Color of Sample | Material Tested | Area sq. in. | Raw Data mCd/m$^2$ White Light | Raw Data mCd/m$^2$ Yellow Light | Retroreflected Luminance mcd/m$^2$/Lx* White Light | Retroreflected Luminance mcd/m$^2$/Lx* Yellow Light | Normalized Area Factor | Normalized Data Retroreflected Lumin. (rational) mcd/m$^2$/Lx White Light | Normalized Data Retroreflected Lumin. (rational) mcd/m$^2$/Lx Yellow Light |
|---|---|---|---|---|---|---|---|---|---|---|
| 1 | Yellow | Ex #11 Mix #2 | 21.11 | 20310 | 6175 | 548 | 167 | 0.84 | 649 | 197 |
| 2 | Yellow | Ex #10 Mix #3 | 20.53 | 40380 | 12160 | 1090 | 328 | 0.82 | 1327 | 400 |
| 3 | White | Ex #10 Mix #2 | 18.25 | 26340 | 9156 | 711 | 247 | 0.75 | 951 | 331 |
| 4 | White | Ex #11 Mix #1 | 17.98 | 54740 | 14990 | 1477 | 405 | 0.74 | 2006 | 549 |
| 5 | Black | Ex #11 Mix #3 | 18.81 | 6224 | 1437 | 168 | 39 | 1.71 | 98 | 23 |
| 6 | Yellow | 3M Tape #L421 | 25.00 | 31520 | 7226 | 851 | 195 | | 851 | 195 |
| 7 | White | 3M Tape #L420 | 25.42 | 65590 | 14850 | 1765 | 401 | | 1765 | 401 |
| 8 | Black | Stimsonite tape | 10.98 | 4150 | 854 | 112 | 23 | | 112 | 23 |

*Evaluated per ASTM D4061 with Photoresearch PR703 Spectraradiometer at Observation angle of 0.2° and Entrance angle of 86°

I claim:

1. A dry formulation for an integrated retroreflective marking, coating or topping material for concrete or asphalt applications comprising a cementitious mixture including a hydraulic or cementitious binder, a dry redispersible polymeric cement modifier, a retroreflective agent filler, said retroreflective agent filler having a surface coating of an adhesion promoter, and optionally, a reflective agent filler.

2. The formulation of claim 1 wherein the retroreflective agent is selected from the group consisting of glass beads, glass bubbles, glass spheres, ceramic spheres, plastic beads, fluorescent glass beads, fluorescent plastic beads, and mixtures thereof, wherein the retroreflective agent has an average topsize of at least about 600 microns.

3. The formulation of claim 2 wherein the retroreflective agent has a surface treatment of a moisture proof, antistatic agent.

4. The formulation of claim 1 wherein the retroreflective agent comprises glass beads having an average topsize of at least about 850 microns.

5. The formulation of claim 1 wherein the reflective agent is selected from the group consisting of glass beads, glass bubbles, glass flakes, glass spheres, ceramic spheres, plastic beads, fluorescent glass beads, fluorescent plastic beads, and mixtures thereof, wherein the reflective filler has an average particle topsize of less than about 600 microns.

6. The formulation of claim 1 including at least one pigment.

7. The formulation of claim 6 wherein the pigment is selected from the classes consisting of organic pigments, inorganic pigments, and hybrid organic/inorganic pigments, and mixtures thereof.

8. The formulation of claim 7 wherein the pigment is at least one of a fluorescent metal oxide pigment and a phosphorescent metal oxide pigment.

9. The formulation of claim 7 wherein the pigment is selected from the group consisting of carbon black, Hansa yellow, chrome oxide, iron oxide, titanium dioxide, zinc sulfate, zinc sulfide, modified zinc sulfide, zinc oxide, titanates, nickel antimony titanates, phthalocyanines, mixed phase spinels, mixed oxides, and mixtures thereof.

10. The formulation of claim 1 wherein the binder is selected from the group consisting of portland cement, high alumina cement, calcium aluminate cement, calciumsulfoaluminate cement, magnesium phosphate cement, magnesium potassium phosphate cement, activated fly ash, activated clay, and slag cement.

11. The formulation of claim 10 wherein the portland cement is selected from the group consisting of Type I, Type II, Type III, Type IV and Type V.

12. The formulation of claim 1 wherein the redispersible polymeric cement modifier is a dry polymer selected from the group consisting of acrylates, methacrylates, ethylene vinyl acetate, styrene-acrylate, styrene-butadiene, polyvinyl acetate, acrylonitrile-butadiene, polychloroprene, vinyl chloride, vinyl laurate, vinyl versatate, vinyl acetate, and blends, copolymers, or terpolymers thereof.

13. The formulation of claim 12 wherein the redispersible polymeric cement modifier is a dry acrylate polymer.

14. The formulation of claim 1 including aggregate.

15. The formulation of claim 14 wherein the aggregate is sand.

16. The formulation of claim 14 wherein the aggregate is coarse aggregate.

17. The formulation of claim 16 wherein the coarse aggregate is selected from the group consisting of silica, quartz, crushed rounded marble, glass spheres, granite, limestone, calcite, feldspar, alluvial sands, and mixtures thereof.

18. The formulation of claim 1 including a dispersant.

19. The formulation of claim 1 including a plasticizer.

20. The formulation of claim 1 including a water reducer.

21. The formulation of claim 1 including at least one admixture selected from the group consisting of an accelerator, an air entrainer, a defoamer, fibers, an inert filler, a natural clay, a pozzolanic filler, a retarder, a rheology modifier, a shrinkage compensating agent, a synthetic clay, a suspending agent, a thickening agent, and mixtures thereof.

22. The formulation of claim 21 wherein the filler is selected from the group consisting of fly ash, kaolin, silica fume, blast furnace slag, calcined clay, diatomaceous earth, rice husk ash, and mixtures thereof.

23. The formulation of claim 21 wherein the inert filler is selected from the group consisting of calcium carbonate, ceramic microspheres, mica, talc, silica flour, and mixtures thereof.

24. The formulation of claim 1 wherein the retroreflective agent has an index of refraction of greater than about 1.5.

25. An integrated, retroreflective marking, coating or topping material for pavement applications prepared substantially onsite from a mixture of water with a dry formulation as set forth in claim 1.

26. The marking material of claim 25 comprising a topping of at least about one eighth inch average thickness.

27. The marking material of claim 26 further comprising an at least partially embedded broadcast of retroreflective agent particles having a topsize of at least about 600 microns at the surface of the topping.

28. The marking material of claim 27 wherein the at least partially embedded broadcast of retroreflective agent particles has a topsize of at least about 850 microns.

29. The marking material of claim 25 comprising a coating of less than about one quarter inch average thickness.

30. The marking material of claim 29 further comprising an at least partially embedded broadcast of retroreflective agent particles having a topsize of at least about 600 microns at the surface of the coating.

31. The marking material of claim 30 wherein the at least partially embedded broadcast of retroreflective agent particles has a topsize of at least about 850 microns.

32. A dry formulation for a cementitious marking, coating or topping material for concrete or asphalt, compatabilized for accepting retroreflective agents comprising a cementitious mixture including a hydraulic or cementitious binder, a retroreflective agent filler, said retroreflective agent filler having a surface coating of an adhesion promoter, and a dry redispersible polymeric cement modifier, wherein the binder is selected from the group consisting of portland cement, high alumina cement, calcium aluminate cement, calcium-sulfoaluminate cement, activated fly ash, activated clay, and slag cement.

33. The formulation of claim 32 wherein the redispersible polymeric cement modifier is a dry polymer selected from the group consisting of acrylates, methacrylates, ethylene vinyl acetate, styrene-acrylate, styrene-butadiene, polyvinyl acetate, acrylonitrile-butadiene, polychloroprene, vinyl chloride, vinyl laurate, vinyl versatate, vinyl acetate, and blends, copolymers, or terpolymers thereof.

34. The formulation of claim 32 wherein the redispersible polymeric cement modifier is a dry acrylate polymer.

35. A cementitious marking, coating or topping material for concrete or asphalt applications prepared substantially onsite from a mixture of water with a dry formulation comprising a cementitious mixture including a hydraulic or cementitious binder, a retroreflective agent filler, said retroreflective agent filler having a surface coating of an adhesion promoter, and a dry redispersible polymeric cement modifier, said marking material having retroreflective agents both integrally contained and at least partially embedded in its surface.

36. The marking material of claim 35 wherein the redispersible polymeric cement modifier is a dry polymer selected from the group consisting of acrylates, methacrylates, ethylene vinyl acetate, styrene-acrylate, styrene-butadiene, polyvinyl acetate, acrylonitrile-butadiene, polychloroprene, vinyl chloride, vinyl laurate, vinyl versatate, vinyl acetate, and blends, copolymers, or terpolymers thereof.

37. The marking material of claim 35 wherein the redispersible polymeric cement modifier is a dry acrylate polymer.

38. The marking material of claim 35, additionally having reflective agents at its surface, wherein the reflective agent is selected from the group consisting of glass beads, glass bubbles, glass flakes, glass spheres, ceramic spheres, plastic beads, fluorescent glass beads, fluorescent plastic beads, and mixtures thereof, wherein the reflective filler has an average particle topsize of less than about 600 microns.

39. The marking material of claim 35 wherein the retroreflective agent is selected from the group consisting of glass beads, glass bubbles, glass spheres, ceramic spheres, plastic beads, fluorescent glass beads, fluorescent plastic beads, and mixtures thereof, wherein the retroflective agent has an average topsize of at least about 600 microns.

40. A dry formulation for an integrated retroreflective marking, coating or topping material for concrete or asphalt applications consisting essentially of a mixture including a hydraulic binder of at least one of magnesium phosphate cement and magnesium potassium phosphate cement, a retroreflective agent filler, and optionally, a reflective agent filler, and further optionally at least one additive selected from the group consisting of accelerators, air entrainers, defoamers, fibers, inert fillers, natural clays, pozzolanic fillers, retarders, rheology modifiers, shrinkage compensating agents, synthetic clays, suspending agents, thickening agents, adhesion promoters, antistatic agents, and mixtures thereof.

41. The formulation of claim 40 wherein the retroreflective agent is selected from the group consisting of glass beads, glass bubbles, glass spheres, ceramic spheres, plastic beads, fluorescent glass beads, fluorescent plastic beads, and mixtures thereof, wherein the retroreflective agent has an average topsize of at least about 600 microns.

42. The formulation of claim 40 wherein the retroreflective agent comprises glass beads having an average topsize of at least about 850 microns.

43. The formulation of claim 40 wherein the reflective agent is selected from the group consisting of glass beads, glass bubbles, glass flakes, glass spheres, ceramic spheres, plastic beads, fluorescent glass beads, fluorescent plastic beads, and mixtures thereof, wherein the reflective filler has an average particle topsize of less than about 600 microns.

44. The formulation of claim 40 including at least one pigment.

45. The formulation of claim 40 including aggregate.

46. The formulation of claim 40 wherein the retroreflective agent has an index of refraction of greater than about 1.5.

47. An integrated, retroreflective marking, coating or topping material for pavement applications prepared substantially onsite from a mixture of water with the dry formulation as set forth in claim 40.

48. An integrated retroreflective marking, coating or topping material for concrete or asphalt applications consisting essentially of a surface including a hydraulic binder of at least one of magnesium phosphate cement and magnesium potassium phosphate cement, having an at least partially embedded broadcast of retroreflective agent particles having a topsize of at least about 600 microns at the surface, and optionally, reflective agent particles, and further optionally, at least one additive selected from the group consisting of accelerators, air entrainers, defoamers, fibers, inert fillers, natural clays, pozzolanic fillers, retarders, rheology modifiers, shrinkage compensating agents, synthetic clays, suspending agents, thickening agents, pigments, aggregates, adhesion promoters, antistatic agents, and mixtures thereof.

49. The marking material of claim 48, additionally having reflective agents at its surface, wherein the reflective agent is selected from the group consisting of glass beads, glass bubbles, glass flakes, glass spheres, ceramic spheres, plastic beads, fluorescent glass beads, fluorescent plastic beads, and mixtures thereof, wherein the reflective agents have an average particle topsize of less than about 600 microns.

50. An integrated, retroreflective, cementitious coating or topping material for concrete or asphalt marking applications, prepared substantially onsite from a mixture of water with a dry formulation comprising a hydraulic or cementitious binder, aggregate, a pigment, a retroreflective agent filler and a dry redispersible polymeric cement modifier to form a cementitious mixture;

said cementitious mixture further including a defoamer, a shrinkage compensating agent, at least one of an accelerator and a retarder, and at least one of a dispersant, a plasticizer or a water reducer;

said retroreflective agent filler having a surface treatment of an adhesion promoter and optionally a moisture proof, antistatic agent;

said marking material having retroreflective agents both integrally contained and at least partially embedded in its surface.

51. The marking material of claim 50 wherein the dry redispersible polymeric cement modifier is present in an amount of about 0.2 to about 10 weight percent of the dry formulation.

52. The marking material of claim 50 wherein the binder is portland cement and the dry redispersible polymeric cement modifier is present in an amount of about 0.5 to about 8 weight percent of the dry formulation.

53. The marking material of claim 50 comprising a coating wherein the dry redispersible polymeric cement modifier is present in an amount of about 4 to about 8 weight percent of the dry formulation.

54. The marking material of claim 50 further including a clear polymeric coat over the partially embedded retroreflective agents.

55. The marking material of claim 50 wherein the retroreflective agent filler has an average topsize of at least about 600 microns.

56. The marking material of claim 50 wherein the retroreflective agent filler has a refractive index of about 1.5 or greater.

57. The marking material of claim 50 wherein the dry formulation contains a glycol plasticizer.

58. The marking material of claim 57 wherein the glycol is neopentyl glycol.

* * * * *